United States Patent
Gaul et al.

[11] Patent Number: 6,101,029
[45] Date of Patent: Aug. 8, 2000

[54] MICROSCOPE CONDENSER WITH AN INTEGRATED CATCH PAN

[75] Inventors: Norbert Gaul, Solms-Oberbiel; Karl Wieber, Asslar-Berghausen, both of Germany

[73] Assignee: Leica Microsystems Wetzlar GmbH, Wetzlar, Germany

[21] Appl. No.: 09/331,650

[22] PCT Filed: Oct. 6, 1998

[86] PCT No.: PCT/DE98/02954

§ 371 Date: Aug. 4, 1999

§ 102(e) Date: Aug. 4, 1999

[87] PCT Pub. No.: WO99/22263

PCT Pub. Date: May 6, 1999

[30] Foreign Application Priority Data

Oct. 23, 1997 [DE] Germany .......................... 197 46 661

[51] Int. Cl.[7] .................................................. G02B 21/06
[52] U.S. Cl. .......................... 359/390; 359/368; 359/391; 359/398
[58] Field of Search .................................... 359/368, 381, 359/384, 390–398, 507–512; 356/244, 246

[56] References Cited

U.S. PATENT DOCUMENTS

| | | | |
|---|---|---|---|
| 2,404,888 | 7/1946 | Richards | 359/390 |
| 4,431,276 | 2/1984 | Weber | 359/391 |
| 4,981,345 | 1/1991 | Berry et al. | 359/391 |
| 5,181,382 | 1/1993 | Middlebrook | 359/398 |
| 5,257,128 | 10/1993 | Diller et al. | 359/398 |
| 5,781,338 | 7/1998 | Kapitza et al. | 359/398 |

FOREIGN PATENT DOCUMENTS

| | | |
|---|---|---|
| 0 029 238 | 5/1981 | European Pat. Off. . |
| 0 100 475 | 2/1984 | European Pat. Off. . |
| 195 41 233 | 5/1996 | Germany . |

*Primary Examiner*—Thong Nguyen
*Attorney, Agent, or Firm*—Foley & Lardner

[57] ABSTRACT

A microscope condenser with a condenser head, with the condenser being fastened to a microscope stand in a manner which allows it to move. A holding device for a glass container filled with a liquid is arranged above the condenser head. A living sample or cell for examination is arranged in the glass container. The microscope condenser in this case has a catch pan for liquid that has overflowed.

4 Claims, 2 Drawing Sheets

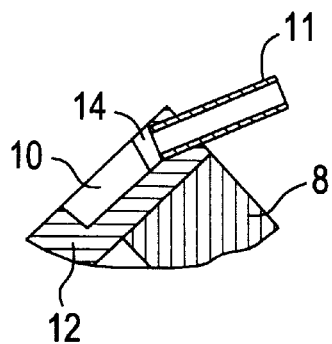
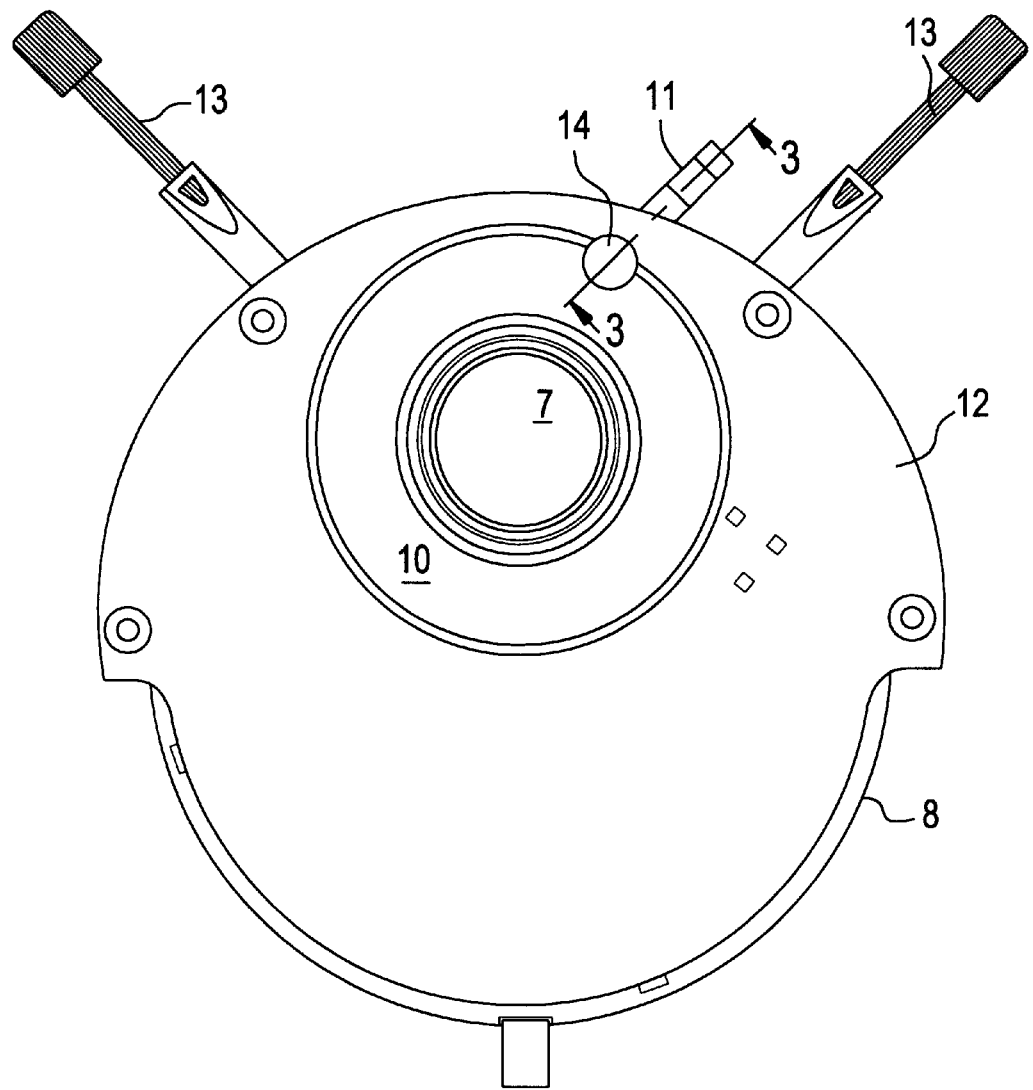

MICROSCOPE CONDENSER WITH AN INTEGRATED CATCH PAN

BACKGROUND OF THE INVENTION

The invention relates to a microscope condenser.

Known microscopes for examining living samples or cells have a microscope stand with an objective turret and a specimen holder or specimen stage provided below the objective turret. A glass container with a liquid for holding the living preparation is provided on the stage or on the specimen holder. Below this glass container, a microscope condenser is arranged in a manner allowing vertical displacement on the microscope stand.

In the case of such IN-VITO or IN-VITRO examinations, the glass container is designed as a petri-dish, bath chamber or perfusion chamber, for example. A temperature-regulated nutrient solution, for example a sugar or salt solution, is used as the liquid in this case. This nutrient solution is continuously exchanged in the glass container via an inlet and outlet. Relatively large quantities of liquid have to be stored as a result of this constant exchange of liquid.

During such examinations, moreover, use is made of controllable micromanipulators for processing the cell or the sample. For optical imaging reasons, the glass containers used are constructed with relatively thin walls and, accordingly, are very fragile. The glass containers may be damaged and lose their tightness as a result of inattentiveness during actuation of the manipulators or else in the event of improper actuation of the focusing device and/or of the condenser device.

When glass breaks in such circumstances, the liquid contained in the glass container and the liquid constantly being fed in anew runs onto the microscope condenser and the parts of the microscope stand situated underneath. The sensitive optical components such a diaphragms, phase annuli, lenses, filters, and the like in the microscope condenser and/or in the microscope stand may be damaged in the process due to the aggressiveness of the liquid used, for example a sugar and/or salt nutrient solution.

Summary of the Invention

The object of the present invention, therefore, is to ensure, in the case of a microscope arrangement of this type, that even when the glass container breaks, the liquid emerging cannot penetrate the microscope condenser and the microscope stand.

This object is achieved according to the invention by means of the features described herein. Advantageous developments are also described.

What the invention has achieved is that if the glass container breaks, the liquid emerging flows past the mount of the glass container, in the first instance by way of the condenser head, and is then taken up by the catch pan integrated in the microscope condenser. It has proved to be advantageous if a hose connection for draining away the liquid is integrated in the catch pan. 'This ensures that even relatively large quantities of running-out nutrient solution can be reliably caught and drained away. The flowing of the liquid over the condenser head is relatively unproblematic, since the housing of said condenser head is constructed in one piece and the front lens is coated and blocked in such a way that no liquid can penetrate there and simple cleaning is possible.

BRIEF DESCRIPTION OF THE DRAWINGS

The invention is explained in more detail using an exemplary embodiment with the aid of the diagrammatic drawing, in which:

FIG. 2 shows a plan view of the microscope condenser; and

FIG. 3 shows a section along the line D—D (FIG. 2) through the microscope condenser.

DETAILED DESCRIPTION OF THE PREFERRED

Figure 1:
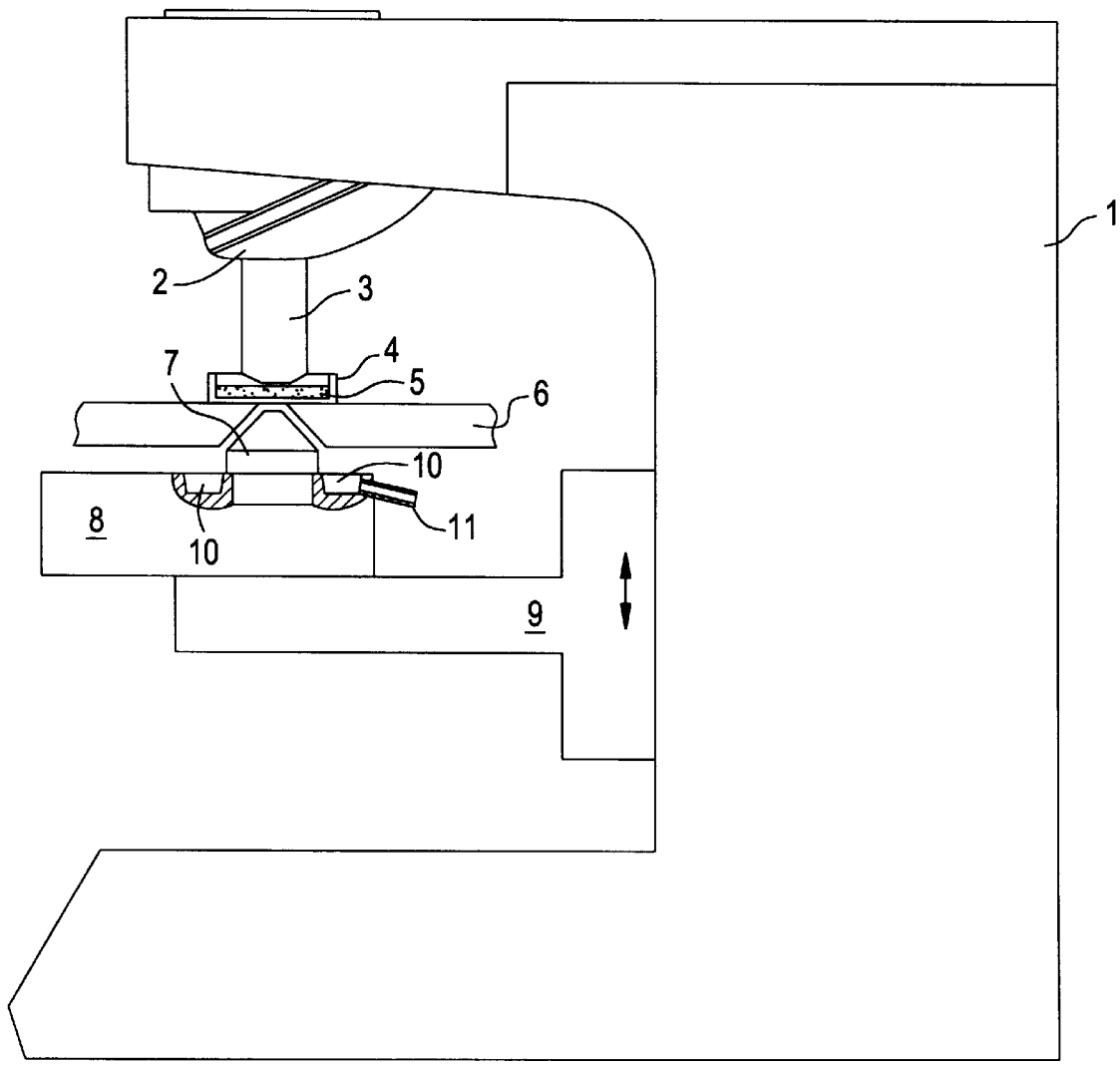
FIG. 1 shows a side view of the microscope arrangement.

FIG. 1 shows a microscope stand 1 with an objective turret 2 and an objective 3 arranged thereon. The objective 3 projects into a glass container 4 containing a liquid 5 and a sample (not additionally illustrated) . The glass container 4 is held by a specimen holder 6, for example a microscope stage, which is designed in such a way that liquid escaping from the glass container can trickle away below the same through the illumination opening. A microscope condenser 8 with a condenser head 7 [sic] is arranged under the base of the glass container 4. The microscope condenser 8 is arranged on the microscope stand 1 in a manner such that it can be displaced in the direction of the double arrow by means of an adjusting device 9. The microscope condenser 8 has a peripheral depression which is designed as a catch pan 10 and is equipped with a hose connection 11. The depression is dimensioned such that it can hold e.g. the liquid content of the glass container 4 if the hose connection 11 is closed.

FIG. 2 shows a plan view of the microscope condenser 8 with the condenser housing 12 and the centering devices 13, which are connected to annular diaphragms (not additionally illustrated) inside the condenser housing. The annularly formed catch pan 10 is provided in the microscope condenser 8, around the condenser head 7, a hole 14 for the hose connection 11 being arranged in the bottom of said catch pan, which connection can, of course, also be closed.

FIG. 3 shows a section along the line D—D from FIG. 2 through the microscope condenser 8 with the condenser housing 12, the catch pan 10 arranged therein, the hole 14 and the hose connection 11 arranged in an inclined manner.

If the glass container 4 breaks, the liquid 5 contained in the glass container 4 and the liquid 5 constantly being fed in anew runs via the condenser head 7 into the catch pan 10, from where it is drained away via the hose connection 11 and a hose which is fastened therein but is not additionally illustrated in the drawings.

List of Reference Symbols

1—Microscope stand
2—Objective turret
3—Objective
4—Glass container
5—Liquid
6—Specimen holder
7—Condenser head
8—Microscope condenser
9—Adjusting device for 8
10—Catch pan
11—Hose connection
12—Condenser housing
13—Centering device
14—Hole

What is claimed is:

1. A microscope comprising:

a condenser with a condenser head, said condenser coupled to a microscope stand via an adjusting device which provides relative displacement of said condenser;

a holding device, arranged above the condenser head for a container which is filled with a liquid and contains a living sample or cell for examination; and a catch pan that is associated with said condenser and has a capacity suitable for accommodating liquid that has overflowed from the container.

2. Microscope condenser according to claim 1, wherein the catch pan is designed as a depression in a condenser housing of the condenser, said depression being arranged around the condenser head.

3. Microscope condenser according to claim 2, further comprising:

a hose connection disposed in said catch pan for draining away liquid collected therein.

4. Microscope condenser according to claim 1, further comprising:

a hose connection disposed in said catch pan for draining away liquid collected therein.

* * * * *